US010565493B2

(12) United States Patent
Merity et al.

(10) Patent No.: US 10,565,493 B2
(45) Date of Patent: Feb. 18, 2020

(54) POINTER SENTINEL MIXTURE ARCHITECTURE

(71) Applicant: salesforce.com, inc., San Francisco, CA (US)

(72) Inventors: Stephen Joseph Merity, San Francisco, CA (US); Caiming Xiong, Palo Alto, CA (US); James Bradbury, San Francisco, CA (US); Richard Socher, Menlo Park, CA (US)

(73) Assignee: salesforce.com, inc., San Francisco, CA (US)

( * ) Notice: Subject to any disclaimer, the term of this patent is extended or adjusted under 35 U.S.C. 154(b) by 489 days.

(21) Appl. No.: 15/421,016

(22) Filed: Jan. 31, 2017

(65) Prior Publication Data

US 2018/0082171 A1   Mar. 22, 2018

Related U.S. Application Data

(60) Provisional application No. 62/397,926, filed on Sep. 22, 2016, provisional application No. 62/398,461, filed on Sep. 22, 2016, provisional application No. 62/417,334, filed on Nov. 4, 2016.

(51) Int. Cl.
*G06N 3/04* (2006.01)
*G06F 17/27* (2006.01)
*G06N 3/08* (2006.01)
*G06N 7/00* (2006.01)

(52) U.S. Cl.
CPC ......... *G06N 3/0445* (2013.01); *G06F 17/277* (2013.01); *G06N 3/0454* (2013.01); *G06N 3/0472* (2013.01); *G06N 3/08* (2013.01); *G06N 3/084* (2013.01); *G06N 7/005* (2013.01)

(58) Field of Classification Search
None
See application file for complete search history.

(56) References Cited

U.S. PATENT DOCUMENTS

| 10,282,663 B2 | 5/2019 | Socher et al. |
| 10,346,721 B2 | 7/2019 | Albright et al. |
| 2016/0117316 A1* | 4/2016 | Le .................. G06N 3/0445 704/9 |
| 2016/0350653 A1 | 12/2016 | Socher et al. |

(Continued)

OTHER PUBLICATIONS

Gulcehre et al., Pointing the Unknown Words, Proceedings of the 54th Annual Meeting of the Association for Computational Linguistics (vol. 1: Long Papers), Jan. 1, 2016, pp. 140-149, Stroudsburg, PA, USA.*

(Continued)

*Primary Examiner* — Kakali Chaki
*Assistant Examiner* — Michael Zidanic
(74) *Attorney, Agent, or Firm* — Haynes and Boone, LLP (57) ABSTRACT

The technology disclosed provides a so-called "pointer sentinel mixture architecture" for neural network sequence models that has the ability to either reproduce a token from a recent context or produce a token from a predefined vocabulary. In one implementation, a pointer sentinel-LSTM architecture achieves state of the art language modeling performance of 70.9 perplexity on the Penn Treebank dataset, while using far fewer parameters than a standard softmax LSTM.

24 Claims, 10 Drawing Sheets

(56) References Cited

U.S. PATENT DOCUMENTS

2017/0024645 A1  1/2017  Socher et al.
2017/0032280 A1  2/2017  Socher

OTHER PUBLICATIONS

Adi et al., "Fine-grained Analysis of Sentence Embeddings Using Auxiliary Prediction Tasks," Published as a conference paper at the International Conference on Learning Representations (ICLR 2017). arXiv:1608.04207v3. Feb. 9, 2017. pp. 1-13.
Ahn et al., "A Neural Knowledge Language Model," Publication: CoRR, abs/1608.00318. arXiv:1608.00318. Aug. 1, 2016. pp. 1-10.
Bahdanau et al., "Neural Machine Translation by Jointly Learning to Align and Translate," Accepted at International Conference on Learning Representations (ICLR) as oral presentation. arXiv preprint arXiv:1409.0473. May 19, 2016. pp. 1-15.
Chelba et al., "One Billion Word Benchmark for Measuring Progress in Statistical Language Modeling," Publication: arXiv preprint arXiv:1312.3005. Dec. 1, 2013. pp. 1-6.
Cheng et al., "Long Short-Term Memory-Networks for Machine Reading," Published as Conference Paper at Empirical Methods in Natural Language Processing (EMNLP). School of Informatics, University of Edinburgh. Sep. 20, 2016. pp. 1-11.
Gal et al., "A Theoretically Grounded Application of Dropout in Recurrent Neural Networks," 30th Conference on Neural Information Processing Systems (NIPS 2016). Barcelona, Spain. Jan. 1, 2016. pp. 1-9.
Gu et al., "Incorporating Copying Mechanism in Sequence-to-Sequence Learning," Proceedings of the 54th Annual Meeting of the Association for Computational Linguistics (ACL). Berlin, Germany. Aug. 7-12, 2016. pp. 1-10.
Gulcehre et al., "Pointing the Unknown Words," Proceedings of the 54th Annual Meeting of the Association for Computational Linguistics (ACL). vol. 1, Long Papers. Berlin, Germany. Aug. 7-12, 2016. pp. 1-10.
Hochreiter et al., "Long Short-Term Memory: Neural Computation," Neural Computation, vol. 9, Issue 8. Nov. 15, 1997. pp. 1-32.
International Search Report issued by the International Searching Authority for PCT Application No. PCT/US2017/052819, dated Dec. 6, 2017. pp. 1-2.
Kadlec et al., "Text Understanding with the Attention Sum Reader Network," Proceedings of the 54th Annual Meeting of the Association for Computational Linguistics (ACL). Berlin, Germany. Aug. 7-12, 2016. pp. 1-11.
Koehn et al., "Moses: Open Source Toolkit for Statistical Machine Translation," Proceedings of the Association for Computational Linguistics 2007 (ACL). Demo and Poster Sessions. Prague. Jun. 1, 2007. pp. 1-4.
Krueger et al., "Zoneout: Regularizing RNNs by Randomly Preserving Hidden Activations," Under review as a conference paper at International Conference on Learning Representations (ICLR). Sep. 22, 2017. pp. 1-11.
Kumar et al. "Ask Me Anything: Dynamic Memory Networks for Natural Language Processing," vol. 48: Proceedings of the International Conference on Machine Learning, New York, NY. Jun. 24, 2015. pp. 1-10.
Ling et al., "Latent Predictor Networks for Code Generation," Publication: eprint arXiv:1603.06744. CoRR, abs/1603.06744. https://arxiv.org/pdf/1603.06744.pdf. Mar. 1, 2016. pp. 1-11.
Marcus et a., "Building a Large Annotated Corpus of English: The Penn Treebank," Association for Computational Linguishes (ACL). University of Pennsylvania, Philadelphia, PA. 1993. pp. 1-18.
Mikolov et al., "Recurrent Neural Network Based Language Model," Conference Interspeech 2010, 11th Annual Conference of the International Speech Communication Association. Jul. 20, 2010. pp. 1-25.
Pascanu et al., "On the difficulty of training recurrent neural networks." Proceedings of the 30th International Conference on Machine Learning (ICML), vol. 28. Atlanta, Georgia. 2013. pp. 1-9.
Rosenfeld, "A Maximum Entropy Approach to Adaptive Statistical Language Modeling," Computer Speech and Language. Carnegie Mellon University, Pittsburgh, PA. May 21, 1996. pp. 1-37.
Sukhbaatar et al., "End-To-End Memory Networks," Conference Paper at the Workshop on Neural Information Processing Systems (NIPS). Nov. 21, 2015. pp. 1-11.
Vinyals et al., "Pointer Networks," In Advances in Neural Information Processing Systems. Jan. 2, 2017. https://arxiv.org/abs/1506.03134v2. pp. 1-9.
Witten Opinion issued by the International Searching Authority for PCT Application No. PCT/US2017/052819, dated Dec. 6, 2017. pp. 1-2.
Xiong et al., "Dynamic Memory Networks for Visual and Textual Question Answering," Proceedings of the 33rd International Conference on Machine Learning, New York, NY, USA. JMLR: W&CP vol. 48. Mar. 4, 2016. pp. 1-10.
Zaremba et al., "Recurrent Neural Network Regularization," Under review as a conference paper at International Conference on Learning Representations (ICLR). Feb. 19, 2015. pp. 1-8.
Zilly et al., "Recurrent Highway Networks." Publication: arXiv preprint arXiv: 1607.03474. https://arxiv.org/pdf/1607.03474.pdf. 2016. pp. 1-12.
Cheng et al., Language Modeling with Sum-Product Networks, in Interspeech, Sep. 14-18, 2014, Singapore, pp. 2098-2012.
Kim et al., "Character-Aware Neural Language Models," Proceedings of the Thirtieth AAAI Conference on Artificial Intelligence (AAAI-16), 2016, pp. 2741-2749.
Mikolov et al., Context Dependent Recurrent Neural Network Language Model, Microsoft Research Techincal Report MSR-TR-2012-92, Jul. 27, 2012, pp. 1-10.
Pascanu et al., "How to Construct Deep Recurrent Neural Networks," arXiv:1312.6026v5, Apr. 24, 2014, pp. 1-13.
Socher et al., "Reasoning with Neural Tensor Networks for Knowledge Base Completion," in Advances in Neural Informaiton Processing Systems, 2013, pp. 1-10.
International Preliminary Report on Patentability for PCT/US2017/052819, dated Nov. 14, 2018, pp. 1-25.

* cited by examiner

| Model | Parameters | Validation | Test |
|---|---|---|---|
| Mikolov & Zweig (2012) - KN-5 | 2M‡ | — | 141.2 |
| Mikolov & Zweig (2012) - KN5 + cache | 2M‡ | — | 125.7 |
| Mikolov & Zweig (2012) - RNN | 6M‡ | — | 124.7 |
| Mikolov & Zweig (2012) - RNN-LDA | 7M‡ | — | 113.7 |
| Mikolov & Zweig (2012) - RNN-LDA + KN-5 + cache | 9M‡ | — | 92.0 |
| Pascanu et al. (2013a) - Deep RNN | 6M | — | 107.5 |
| Cheng et al. (2014) - Sum-Prod Net | 5M‡ | — | 100.0 |
| Zaremba et al. (2014) - LSTM (medium) | 20M | 86.2 | 82.7 |
| Zaremba et al. (2014) - LSTM (large) | 66M | 82.2 | 78.4 |
| Gal (2015) - Variational LSTM (medium, untied) | 20M | 81.9 ± 0.2 | 79.7 ± 0.1 |
| Gal (2015) - Variational LSTM (medium, untied, MC) | 20M | — | 78.6 ± 0.1 |
| Gal (2015) - Variational LSTM (large, untied) | 66M | 77.9 ± 0.3 | 75.2 ± 0.2 |
| Gal (2015) - Variational LSTM (large, untied, MC) | 66M | — | 73.4 ± 0.0 |
| Kim et al. (2016) - CharCNN | 19M | — | 78.9 |
| Zilly et al. (2016) - Variational RHN | 32M | 72.8 | 71.3 |
| Zoneout + Variational LSTM (medium) | 20M | 84.4 | 80.6 |
| Pointer Sentinel-LSTM (medium) | 21M | 72.4 | 70.9 |

FIG. 5

| Model | Parameters | Validation | Test |
|---|---|---|---|
| Variational LSTM implementation from Gal (2015) | 20M | 101.7 | 96.3 |
| Zoneout + Variational LSTM | 20M | 108.7 | 100.9 |
| Pointer Sentinel-LSTM | 21M | 84.8 | 80.8 |

POINTER SENTINEL MIXTURE ARCHITECTURE

CROSS REFERENCE TO OTHER APPLICATIONS

This application claims the benefit of U.S. Provisional Patent Application 62/397,926, "POINTER SENTINEL MIXTURE MODELS", filed on Sep. 22, 2016. The priority provisional application is hereby incorporated by reference;

This application claims the benefit of U.S. Provisional Patent Application 62/398,461, "POINTER SENTINEL MIXTURE MODELS", filed on Sep. 22, 2016. The priority provisional application is hereby incorporated by reference; and This application claims the benefit of U.S. Provisional Patent Application 62/417,334, "POINTER SENTINEL MIXTURE MODELS", filed on Nov. 4, 2016. The priority provisional application is hereby incorporated by reference.

FIELD OF THE TECHNOLOGY DISCLOSED

The technology disclosed relates generally to natural language processing (NLP) using deep neural networks, and in particular relates to a pointer sentinel mixture architecture that improves prediction of rare and out of vocabulary (OoV) tokens in neural network sequence modeling.

BACKGROUND

The subject matter discussed in this section should not be assumed to be prior art merely as a result of its mention in this section. Similarly, a problem mentioned in this section or associated with the subject matter provided as background should not be assumed to have been previously recognized in the prior art. The subject matter in this section merely represents different approaches, which in and of themselves can also correspond to implementations of the claimed technology.

Recent neural network sequence models with softmax classifiers have achieved their best language modeling performance only with very large hidden states and large vocabularies. Even then they struggle to predict rare or unseen words even if the context makes the prediction unambiguous. The technology disclosed provides a so-called "pointer sentinel mixture architecture" for neural network sequence models that has the ability to either reproduce a token from a recent context or produce a token from a predefined vocabulary. In one implementation, a pointer sentinel-LSTM architecture achieves state of the art language modeling performance of 70.9 perplexity on the Penn Treebank dataset, while using far fewer parameters than a standard softmax LSTM.

BRIEF DESCRIPTION OF THE DRAWINGS

In the drawings, like reference characters generally refer to like parts throughout the different views. Also, the drawings are not necessarily to scale, with an emphasis instead generally being placed upon illustrating the principles of the technology disclosed. In the following description, various implementations of the technology disclosed are described with reference to the following drawings, in which.

DETAILED DESCRIPTION

The following discussion is presented to enable any person skilled in the art to make and use the technology disclosed, and is provided in the context of a particular application and its requirements. Various modifications to the disclosed implementations will be readily apparent to those skilled in the art, and the general principles defined herein may be applied to other implementations and applications without departing from the spirit and scope of the technology disclosed. Thus, the technology disclosed is not intended to be limited to the implementations shown, but is to be accorded the widest scope consistent with the principles and features disclosed herein.

The discussion is organized as follows. First, an introduction describing some of the problems addressed by the pointer sentinel mixture architecture is presented. Then, the pointer network is described, followed by some examples of operation of the pointer sentinel mixture architecture. Lastly, some experimental results illustrating performance of the pointer sentinel mixture architecture on various NLP datasets and tasks are provided.

Introduction

A major difficulty in language modeling is learning when to predict specific tokens from the immediate context. For instance, imagine a new person is introduced and two paragraphs later the context would allow one to very accurately predict this person's name as the next token. For standard neural network sequence models to predict this name, they would have to encode the name, store it for many time steps in their hidden state, and then decode it when appropriate. As the hidden state is limited in capacity and the optimization of such models suffers from the vanishing gradient problem, this is a lossy operation when performed over many timesteps. This is especially true for rare tokens.

Models with soft attention or memory components have been proposed to help deal with this challenge, aiming to allow for the retrieval and use of relevant previous hidden states, in effect increasing hidden state capacity and providing a path for gradients not tied to timesteps. Even with attention, the standard softmax classifier that is being used in these models often struggles to correctly predict rare or previously unknown tokens.

Pointer networks provide one potential solution for rare and out of vocabulary (OoV) tokens as a pointer network uses attention to select an element from the input as output. This allows it to produce previously unseen input tokens. While pointer networks improve performance on rare tokens and long term dependencies, they are unable to select tokens that do not exist in the input, a common scenario in language modeling.

To address these problems, the technology disclosed provides a so-called "pointer sentinel mixture architecture" that combines the advantages of standard softmax classifiers with those of a pointer network for effective and efficient language modeling. Rather than relying on the RNN hidden state to decide when to use the pointer network, the pointer sentinel mixture architecture allows the pointer network itself to decide when to use the vocabulary through a sentinel gate vector. The pointer sentinel mixture architecture improves the state of the art perplexity on the Penn Treebank dataset.

Pointer Sentinel Mixture Architecture

Figure 1:
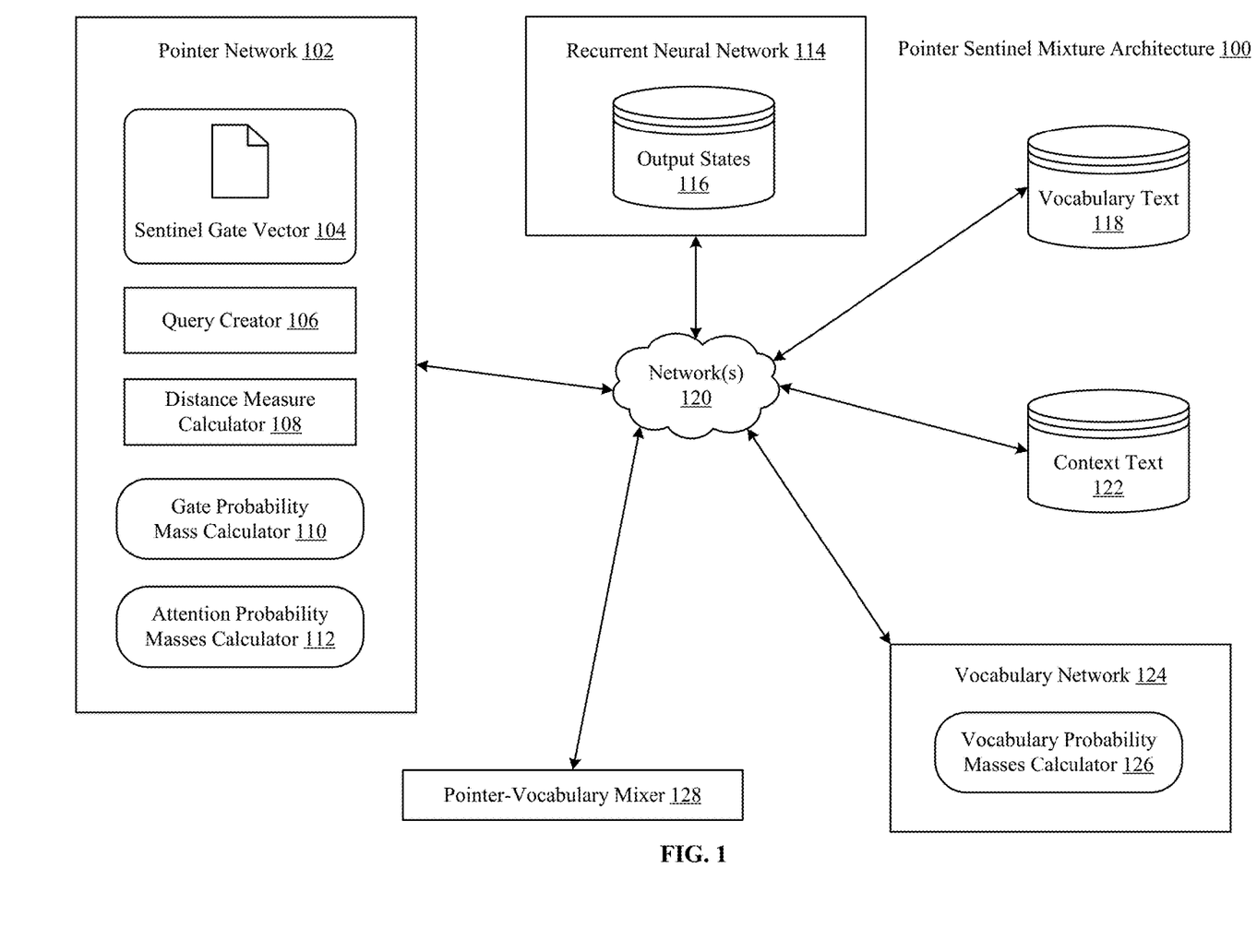
FIG. 1 illustrates aspects of a pointer sentinel mixture architecture that improves prediction of rare and out of vocabulary (OoV) tokens in neural network sequence modeling.
Figure 2:
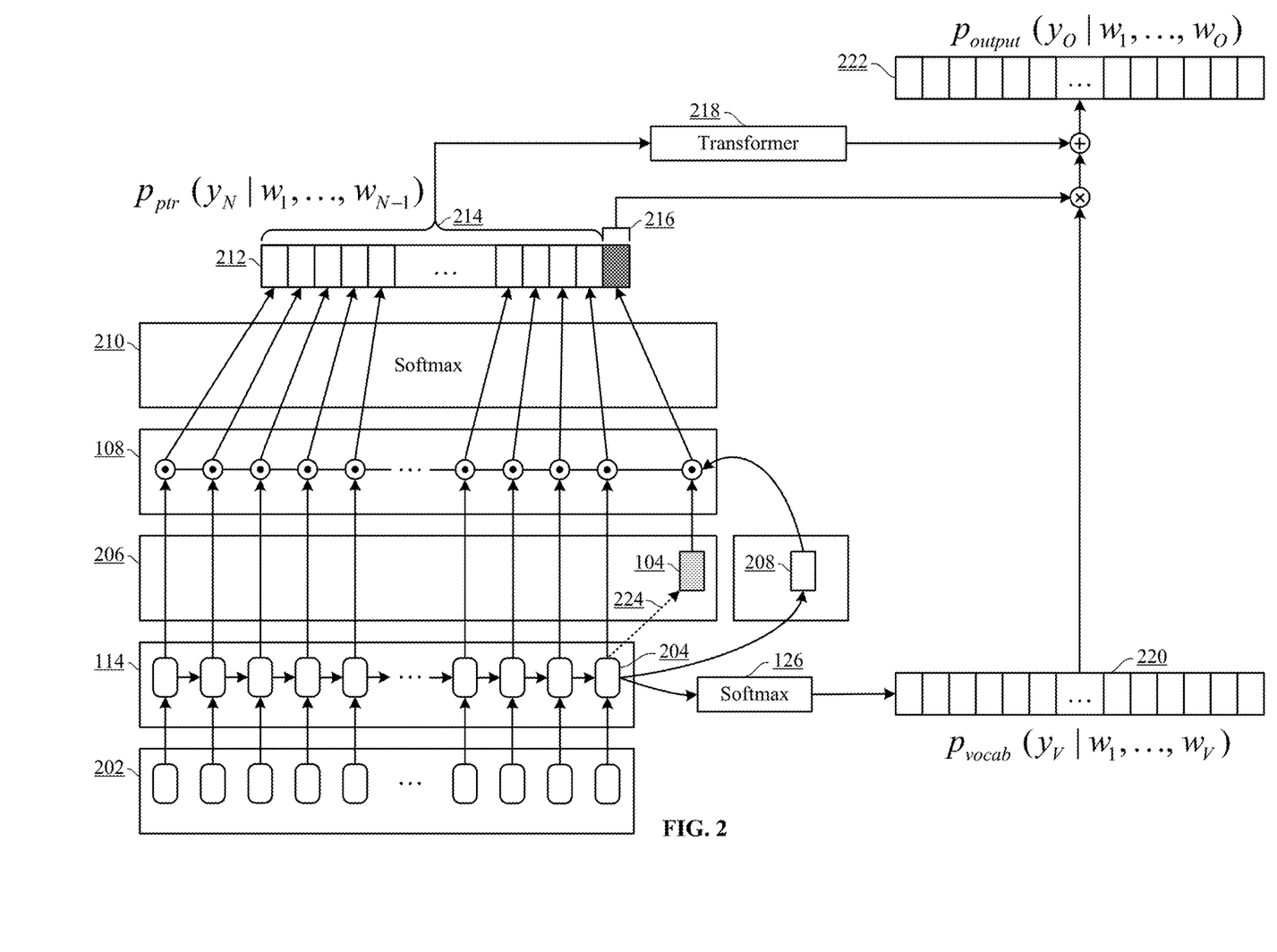
FIG. 2 shows one implementation of operation of the pointer sentinel mixture architecture of FIG. 1.

FIG. 1 illustrates aspects of a pointer sentinel mixture architecture 100 that improves prediction of rare and out of vocabulary (OoV) tokens in neural network sequence modeling. FIG. 2 shows one implementation of operation of the pointer sentinel mixture architecture 100.

Given a sequence or window of tokens $w_1, \ldots, w_{N-1}$ 202, also referred to herein as the "context text" or "pointer window", the pointer sentinel mixture architecture 100 predicts the next token $w_N$. The context text is stored in a database 122. As used herein, the term "token" can refer to a word, a character, or a phrase.

The pointer sentinel mixture architecture 100 includes a recurrent neural network (RNN) 114. RNNs have seen widespread use for language modeling due to their ability to retain long term dependencies. RNNs employ the chain rule to factorize the joint probabilities over a sequence of tokens:

$$p(w_1, \ldots, w_N) = \prod_{h_i}^{N} i = 1 p(w_i | w_1, \ldots, w_{i-1}).$$

More precisely, at each time step i, a RNN hidden state $h_i$ is computed in dependence upon the previous hidden state $h_{i-1}$ and the input $x_i$ such that $h_i = RNN(x_i, h_{i-1})$. The hidden states of the RNN 114 generated over the window of tokens $w_1, \ldots, w_{N-1}$, also referred to herein as the "output states" or "output state vectors", are stored in a database 116.

When all the N-1 tokens have been processed by the RNN 114, the final output state vector $h_{N-1}$ 204 is provided to a vocabulary network 124. The vocabulary network 124 includes a vocabulary probability masses calculator 126, which feeds the final output state vector $h_{N-1}$ 204 into an exponential normalizer (e.g., a softmax layer) and computes a distribution of vocabulary probability masses over a vocabulary of possible tokens, also referred to herein as the "vocabulary distribution" 220. As such, in implementations, a sum of the vocabulary probability masses is a predetermined constant (e.g., 1, 2, 10, and so on).

The following mathematical formulation shows one implementation of operation of the vocabulary network 124 and the vocabulary probability masses calculator 126:

$$p_{vocab}(w) \text{softmax}(Uh_{N-1}),$$

where $p_{vocab} \in \mathbb{R}^V$ is the vocabulary distribution 220, $U \in \mathbb{R}^{V \times H}$, H is the hidden size, and V is the vocabulary size.

The vocabulary, also referred to herein as the "vocabulary text", is stored in a database 118.

RNNs can suffer from the vanishing gradient problem. The long short-term memory (LSTM) architecture has been proposed to deal with the vanishing gradient problem by updating the hidden state according to a set of gates. The pointer sentinel mixture architecture uses the LSTM, in one implementation. In other implementations, it uses variants of the LSTM, such as no input gate (NIG) variant, no forget gate (NFG) variant, no output gate (NOG) variant, no input activation function (NIAF) variant, no output activation function (NOAF) variant, no peepholes (NP) variant, coupled input-forget gate (CIFG) variant, and full gate recurrent (FGR) variant. In yet other implementations, it uses a gated recurrent unit (GRU), or any other type of RNN, or any other conventional or future-developed neural network, such as the ones that employ a softmax classifier.

The pointer sentinel mixture architecture 100 also includes a pointer network 102. To predict the next token $w_N$ in the sequence, the pointer network 102 selects a member of the input sequence $p(w_1, \ldots, w_{N-1})$ with the maximal attention probability mass as the output, according to one implementation. The pointer network 102 comprises an attention probability masses calculator 112, which computes an attention probability mass 214 for a specific hidden state using an inner product with all the past hidden states h, with each hidden state being $h_i \in \mathbb{R}^H$. As used herein, "inner product" is referred to as "dot product", "distance measure product", and/or "linguistic similarity determiner". In another implementation, to compute an attention probability mass 214 for the most recent token (since this token may be repeated), the attention probability masses calculator 112 also includes the last hidden state itself in the inner product. In implementations, the inner product is carried out by a distance measure calculator 108 of the pointer network 102, which produces respective unnormalized attention values for each of the token position in the window of tokens $w_1, \ldots, w_{N-1}$. Then, the attention probability masses calculator 112 uses an exponential normalizer, like a softmax activation function, to generate the normalized attention probability masses 214 from the unnormalized attention values.

Taking the inner product of a vector with itself results in the vector's magnitude squared, meaning the attention probability masses 214 would be strongly biased towards the most recent token. To resolve this problem, the pointer network 102 comprises a query creator 106, which projects the current output state vector through a linear layer (e.g., a multilayer perceptron) to produce a nonlinear projection in the form of a so-called "query vector" q 208. The following mathematical formulation shows one implementation of generating the query vector q 208:

$$q = \tan h(Wh_{N-1} + b),$$

where $W \in \mathbb{R}^{H \times H}$, $b \in \mathbb{R}^H$, and $q \in \mathbb{R}^H$.

In another implementation, the attention probability masses calculator 112 computes an attention probability mass 214 for each token position in the window of tokens $w_1, \ldots, w_{N-1}$ by calculating an inner product between the previous RNN output states $h_i$ and the query vector q 208, followed by a softmax activation function to obtain a probability distribution, as shown in the following mathematical formulation:

$$z_i = q^T h_i,$$

$$a = \text{softmax}(z),$$

where $z \in \mathbb{R}^L$, $a \in \mathbb{R}^L$, and L is the total number of hidden states. In implementations, the inner product between the output states $h_i$ and the query vector q 208 is carried out by the distance measure calculator 108, which produces respective unnormalized attention values for each of the token position in the window of tokens $w_1, \ldots, w_{N-1}$. Then, the attention probability masses calculator 112 uses an exponential normalizer, like the softmax activation function, to generate the normalized attention probability masses 214 from the unnormalized attention values.

When a token appears at multiple positions in the context text, the final attention probability mass assigned to the token is the sum of the attention probability masses given to all token positions where the token appears, as shown in the following mathematical formulation:

$$p_{ptr}(w) = \sum_{i \in I(w,x)} a_i,$$

where $I(w,x)$ results in all positions of the token W in the input x and $p_{ptr} \in \mathbb{R}^V$ is the pointer distribution.

Given the length of the documents used in language modeling, it may not be feasible for the pointer network 102 to evaluate attention probability masses 214 for all the tokens back to the beginning of the dataset. Instead, in some implementations, the pointer network 102 elects to maintain only a window of M most recent tokens to match against. The length M of the window is a hyperparameter that can be tuned on a held out dataset or by empirically analyzing how frequently a token at position t appears in the last M tokens.

To illustrate the advantages of this approach, consider a long article featuring two sentences "President Obama discussed the economy" and "President Obama then flew to Prague". If the query is "Which President is the article about?", attention probability masses could be calculated for "Obama" in either sentence. If the question instead is "Who flew to Prague?", only the latter occurrence of "Obama" provides the proper context. The pointer network 102 ensures that, as long as the final attention probability mass is distributed over all the occurrences of "Obama", the pointer network 102 achieves zero loss. This flexibility provides supervision without forcing the pointer network 102 to put attention probability mass on supervision signals that may be incorrect or lack proper context.

Accordingly, the pointer sentinel mixture architecture 100 has two base distributions: the distribution of attention probability masses 214 over the tokens in the context text 122 calculated by the pointer network 102 (also referred to herein as the "pointer distribution" 214) and the distribution of vocabulary probability masses over the tokens in the vocabulary text 118 (also referred to herein as the "vocabulary distribution" 220). To combine the two base distributions, the pointer sentinel mixture architecture 100 has a pointer-vocabulary mixer 128 that implements a gating function, referred to herein as the "gate probability mass" g 216. The gate probability mass g 216 is derived from a so-called "sentinel gate vector" 104 of the pointer network 102. In implementations, the sentinel gate vector 104 is part of a sentinel layer 206 of the pointer network 102. The sentinel gate vector 104 controls accumulation of information from the vocabulary network 124 and the pointer network 102. That is, the sentinel gate vector 104 governs mixing of the attention probability masses 214 and the vocabulary probability masses 220, as illustrated in the following mathematical formulations:

$$g = p(z_i = k | x_i),$$

$$p_{out}(y_i|x_i) = g \, p_{vocab}(y_i|x_i) + (1-g) p_{ptr}(y_i|x_i),$$

where $z_i \in \mathbb{R}^H$ is the sentinel gate vector 104 that is trained a priori to dictate which base distribution a data point belongs to during testing and $p_{out} \in \mathbb{R}^O$ is a distribution of output probability masses over tokens O (also referred to herein as the "output distribution" 222), where O represents the tokens in the context text 122 and the vocabulary text 118 such that each token is identified in the output distribution 222 only once.

In one implementation, the sentinel gate vector 104 is a trained vector that is not modified during the testing and remains fixed. In another implementation, the sentinel gate vector 104 is a trained vector that is dynamically modified during the testing in dependence upon the final output state vector $h_{N-1}$ 204 produced for a given input sequence of context text. In the dynamic implementation, the sentinel gate vector 104 is combined 224 with the final output state vector $h_{N-1}$ 204 (e.g., using concatenation or elementwise summation), and the combination of the two is projected through a linear layer (e.g., a multilayer perceptron) to produce a nonlinear projection in the form of a so-called "dynamic sentinel state vector". The following mathematical formulation shows one implementation of the dynamic sentinel state vector $z_d$:

$$z_d = \tan h[W(h_{N-1}; z_i) + b],$$

where $W \in \mathbb{R}^{H \times H}$, $b \in \mathbb{R}^H$, $z_d \in \mathbb{R}^H$, and ; denotes concatenation.

To train the sentinel gate vector 104, the pointer sentinel mixture architecture 100 implements a sentinel loss function. Implementing the sentinel loss function includes minimizing the cross-entropy loss of $$-\sum_j \hat{y}_{ij} \log p(y_{ij} | x_i),$$

where $\hat{y}_i$ is a one hot encoding of the correct output. During training, as $\hat{y}_i$ is one hot, only a single mixed probability $p(y_{ij})$ is computed for calculating the loss. This results in a far more efficient GPU implementation. At prediction time, for all values of $p(y_i|x_i)$, a maximum of L token probabilities is mixed, as there is a maximum of L unique tokens in the pointer window of length L. This mixing occurs on the CPU where random access indexing is more efficient than the GPU. The sentinel loss function then becomes $-\log(g + \sum_{i \in I(y,x)} a_i)$ where $I(y,x)$ results in all positions of the correct output y in the input x.

To produce the gate probability mass g 216, a gate probability mass calculator 110 of the pointer network 102 calculates an inner product between the sentinel gate vector 104 and the query vector q 208. In the fixed implementation, the gate probability mass calculator 110 calculates the inner product between a fixed sentinel gate vector and the query vector q 208. In a dynamic implementation, the gate probability mass calculator 110 calculates the inner product between a dynamic sentinel gate vector and the query vector q 208. The result of the inner product is an unnormalized gate value.

Next, the gate probability mass calculator 110 uses an exponential normalizer, like a softmax activation function, to generate the gate probability mass g 216 from the unnormalized gate value. In implementations, the unnormalized attention values for each of the token position in the window of tokens $w_1, \ldots, w_{N-1}$ and the unnormalized gate value are arrayed and/or arranged and/or concatenated in a so-called "pointer sequence". Then, an exponential normalizer (e.g., softmax) is applied to the pointer sequence to generate the normalized attention probability masses 214 from the unnormalized attention values and the gate probability mass g 216 from the unnormalized gate value. That is, the attention probability masses calculator 112 and the gate probability mass calculator 110 share a single exponential normalizer 210 (e.g., softmax) that applies in parallel to the unnormalized attention values and the unnormalized gate value of the pointer sequence to calculate a joint probability mass a 212. As such, in implementations, a sum of the attention probability masses 214 and the gate probability mass g 216 is a predetermined constant (e.g., 1, 2, 10, and so on). The following mathematical formulation describes the joint probability mass a 212 over the pointer sequence:

$$a = \text{softmax}([r; qz_i]),$$

where $a \in \mathbb{R}^{V+1}$ is the joint probability mass distribution 212 over both the tokens in the context text 122 as well as the sentinel gate vector 104, r is the vector containing the unnormalized attention values for each of the token position in the window of tokens $w_1, \ldots, w_{N-1}$ in the context text 122, q is the query vector 208, $z_i$ is the sentinel gate vector 104, ";" denotes concatenation, and the values within the square brackets [ ] together represent the pointer sequence. The last element of the joint probability mass distribution a 212 is interpreted to be the gate probability mass g 216, with g=a [V+1].

Thus, in one implementation, the normalized pointer distribution then becomes:

$$p_{ptr}(y_i \mid x_i) = \frac{1}{1-g} a[1:V],$$

where [1:V] denotes the first V elements of the vector.

The output distribution 222 $p_{out}(y_i|x_i)$ then becomes:

$$p_{out}(y_i \mid x_i) = g p_{vocab}(y_i \mid x_i) + (1-g) \frac{1}{1-g} p_{ptr}(y_i \mid x_i),$$

$$p_{out}(y_i \mid x_i) = g p_{vocab}(y_i \mid x_i) + p_{ptr}(y_i \mid x_i),$$

where the pointer-vocabulary mixer 128 uses the gate probability mass g 216 to mix the vocabulary distribution 220 $p_{vocab}(y_i|x_i)$ and the pointer distribution 214 $p_{ptr}(y_i|x_i)$ and produces the output distribution 222 $p_{out}(y_i|x_i)$.

In implementations, the gate probability mass g 216 is a scalar in the range [0, 1]. A value of 0 implies that only the pointer network 102 is used and 1 means only the vocabulary network 124 is used. Thus the pointer sentinel mixture architecture 100 relies on the gate probability mass g 216 to use the pointer network 102 whenever possible and back-off to the vocabulary network 124 otherwise. By using the sentinel gate vector 104 to integrate the gating function into the computations of the pointer network 102, the pointer sentinel mixture architecture 100 is influenced by both the hidden states of the RNN 114 and the window of tokens in the immediate context text 122.

The integration allows the gate probability mass g 216 to use as much context as possible. The decision to back-off to the vocabulary distribution 220 is then informed by both the query vector q 208, generated using the final output state vector $h_{N-1}$ 204 of the RNN 114, and from the contents of the hidden states for the pointer window itself. This allows the pointer sentinel mixture architecture 100 to accurately query which hidden states are contained in the pointer window and avoid maintaining state for tokens that may have fallen out of the pointer window.

In some implementations, prior to the mixing governed by the gate probability mass g 216, a transformer 218 is used to transform the dimensionality of the pointer distribution 214 to match that of the vocabulary distribution 220.

During training, the gate probability mass g 216 can be assigned all probability mass if, for instance, the correct output $\hat{y}_i$ exists only in the vocabulary distribution 220. In some implementations, there is no penalty if the pointer sentinel mixture architecture 100 places the entire probability mass on any of the instances of the correct token in the pointer window. If the pointer network 102 places the entirety of the probability mass on the gate probability mass g 216, the pointer network 102 incurs no penalty and the loss is entirely determined by the loss of the vocabulary network 124, according to some implementations.

In one implementation, an LSTM-based pointer sentinel mixture architecture 100 (also referred to herein as the "pointer sentinel-LSTM") results in a relatively minor increase in parameters and hyperparameters and computation time, especially when compared to the model size required to achieve similar performance using a standard LSTM. The only two additional parameters required by the architecture 100 are those required for computing the query vector q 208, specifically $W \in \mathbb{R}^{H \times H}$ and $b \in \mathbb{R}^H$, and the sentinel gate vector embedding, $z_i \in \mathbb{R}^H$. This is independent of the depth of the RNN 114, as the pointer network 102 only interacts with the output of the final RNN layer. The additional $H^2 + 2H$ parameters are minor compared to a single LSTM layer's $8H^2 + 4H$ parameters. Some implementations also include using multiple LSTM layers. In terms of additional computation, a pointer sentinel-LSTM of window size L only requires computing the query vector q 208 using a linear layer with tank activation, a total of L parallelizable inner product calculations, and the attention probability masses 214 for the L resulting scalars via the softmax function.

Other implementations of the pointer sentinel mixture architecture 100 include using normalizers different than, in addition to, and/or in combination with the exponential normalizer. Some examples include sigmoid based normalizers (e.g., multiclass sigmoid, piecewise ramp), hyperbolic tangent based normalizers, rectified linear unit (ReLU) based normalizers, identify based normalizers, logistic based normalizers, sine based normalizers, cosine based normalizers, unit sum based normalizers, and step based normalizers. Other examples include hierarchical softmax, differentiated softmax, importance sampling, noise contrastive estimation, negative sampling, gated softmax spherical softmax, Taylor softmax, and sparsemax. In yet other implementations, any other conventional or future-developed normalizer can be used.

The components in FIG. 1 can be implemented in hardware or software, and need not be divided up in precisely the same blocks as shown in FIG. 1. Some of the components can also be implemented on different processors or computers, or spread among a number of different processors or computers. In addition, it will be appreciated that some of the components can be combined, operated in parallel or in a different sequence than that shown in FIG. 1 without affecting the functions achieved. Also as used herein, the term "component" can include "sub-components", which themselves can be considered herein to constitute components. For example, the sentinel gate vector 104, the query creator 106, the distance measure calculator 108, the gate probability mass calculator 110, and the attention probability masses calculator 112 can also be considered herein to be sub-components of the pointer network 102. Furthermore, the blocks in FIG. 1 can also be thought of as flowchart steps in a method. A component or sub-component also need not necessarily have all its code disposed contiguously in memory; some parts of the code can be separated from other parts of the code with code from other components or sub-components or other functions disposed in between. Also, the components in FIG. 1 are connected via a network(s) 120.

In some implementations, the pointer network 102 and the vocabulary network 124 are entirely separate. In other implementations, they share many of the parameters and hyperparameters. In one implementation, the sharing minimizes the total number of parameters and hyperparameters in the pointer sentinel mixture architecture 100 and improves the pointer network 102's supervision of the vocabulary network 124.

Figure 3:
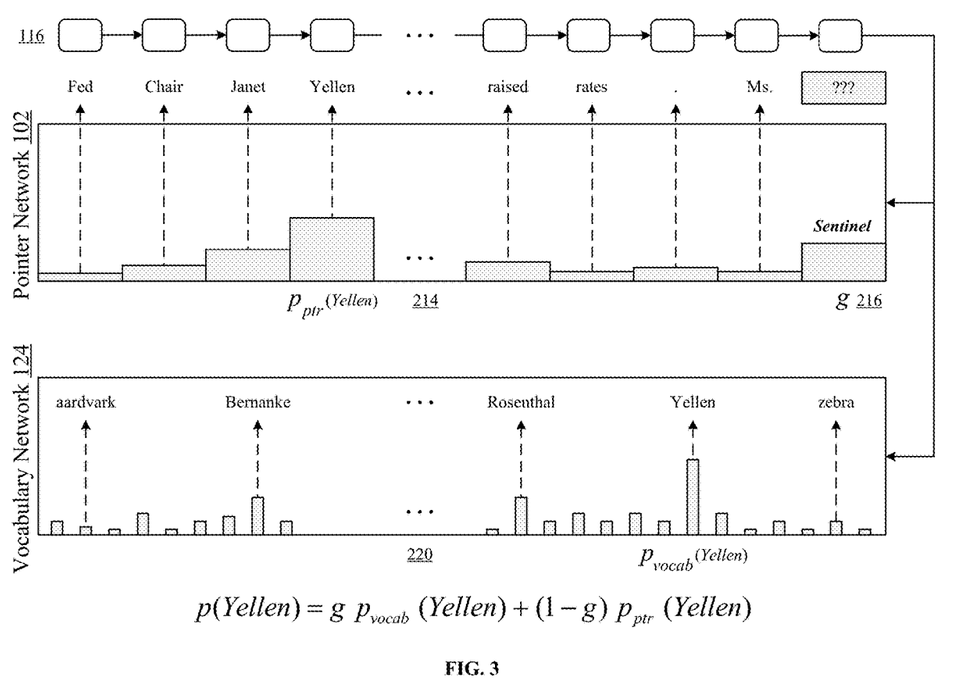
FIG. 3 depicts one implementation of a sentinel gate vector that dictates how much weight to give to a pointer network and to a vocabulary network.

FIG. 3 depicts one implementation of the sentinel gate vector 104 that dictates how much weight to give to the pointer network 102 and to a vocabulary network 124. In the example shown in FIG. 3, the pointer sentinel mixture architecture 100 predicts the next word after seeing a set of sentences like "Fed Chair Janet Yellen . . . raised rates. Ms. ???".

In FIG. 3, at the bottom, the vocabulary network 124 predicts the next word using the fixed set of words in the vocabulary text 118. This knowledge may be more related to the distant past, such as old references or training data involving the previous Fed Char Ben Barnanke. Also in FIG. 3, at the top, the pointer network 102 predicts the next word using the story's recent history. By looking at the relevant context, it realizes that "Janet Yellen" will likely be referred to again, and also realizing that "Janet" is a first name and that it needs a last name, the pointer network 102 points to "Yellen".

By mixing the two information sources, i.e., by first "pointing" to recent relevant words using context and then otherwise using the RNN's internal memory and vocabulary if there is no good context, the pointer sentinel mixture architecture 100 is able to get a far more confident answer.

Figure 4:
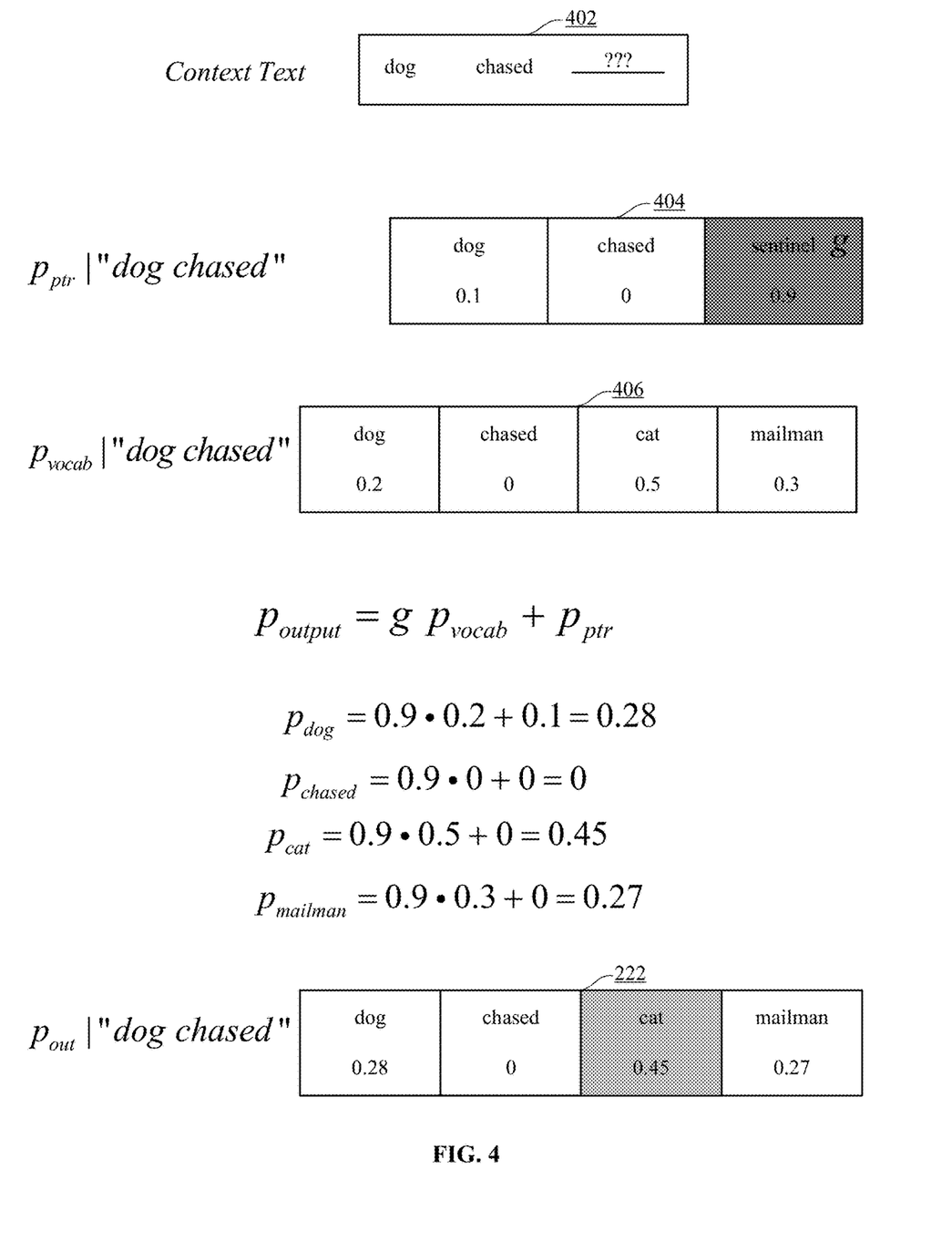
FIG. 4 is a numerical example that shows one implementation of operation of the pointer sentinel mixture architecture of FIG. 1.

FIG. 4 is a numerical example that shows one implementation of operation of the pointer sentinel mixture architecture 100. In FIG. 4, the words "dog" and "chased" represent the input sequence or the context words 402 such that the NLP task is to predict the next missing word ??? in light of the preceding words "dog" and "chased".

The pointer distribution 214 calculated by the pointer network 102 assigns the word "dog" an attention probability mass of 0.1 and assigns the word "chased" an attention probability mass of 0. Further, the gate probability mass g 216 determined by the pointer network 102 is 0.9. Note that the joint probability mass a over the pointer sequence 404 adds to a unit sum.

Also assume that in the example shown in FIG. 4 the vocabulary text 118 comprises only four known words 406, namely, "dog", "chased", "cat", and "mailman". Accordingly, the vocabulary distribution 220 calculated by the vocabulary network 124 assigns the word "dog" a vocabulary probability mass of 0.2, assigns the word "chased" a vocabulary probability mass of 0, assigns the word "cat" a vocabulary probability mass of 0.5, and assigns the word "mailman" a vocabulary probability mass of 0.3. Note that the vocabulary distribution 220 over the vocabulary words 406 adds to a unit sum.

To identify the missing word ???, the output distribution 222 is calculated by mixing the pointer distribution 214 and the vocabulary distribution 220 such that the mixing is governed by the gate probability mass g 216 of 0.9. As shown in FIG. 4, the output distribution for the word "dog" is calculated to be 0.28, the output distribution for the word "chased" is calculated to be 0, the output distribution for the word "cat" is calculated to be 0.45, and the output distribution for the word "mailman" is calculated to be 0.27. Note that the output distribution 222 over the context words 402 and the vocabulary words 406 adds to a unit sum.

Finally, the word with a maximal or highest output probability mass is selected as the missing word ???, which in this example is the word "cat".

In one implementation, if a selected token that completes the context text 122 is in the context text 122 and not in the vocabulary text 118, then an output probability mass is produced for the token in dependence upon a corresponding attention probability mass. In another implementation, if a token is in the vocabulary text 118 is and not in the context text 122, then an output probability mass is produced for the token in dependence upon multiplying the gate probability mass g 216 with a corresponding vocabulary probability mass. In yet another implementation, if a token is in both the context text 122 and the vocabulary text 118, then an output probability mass is produced for the token in dependence upon multiplying the gate probability mass g 216 with a corresponding vocabulary probability mass and adding a corresponding attention probability mass.

Experimental Results

Figure 5:
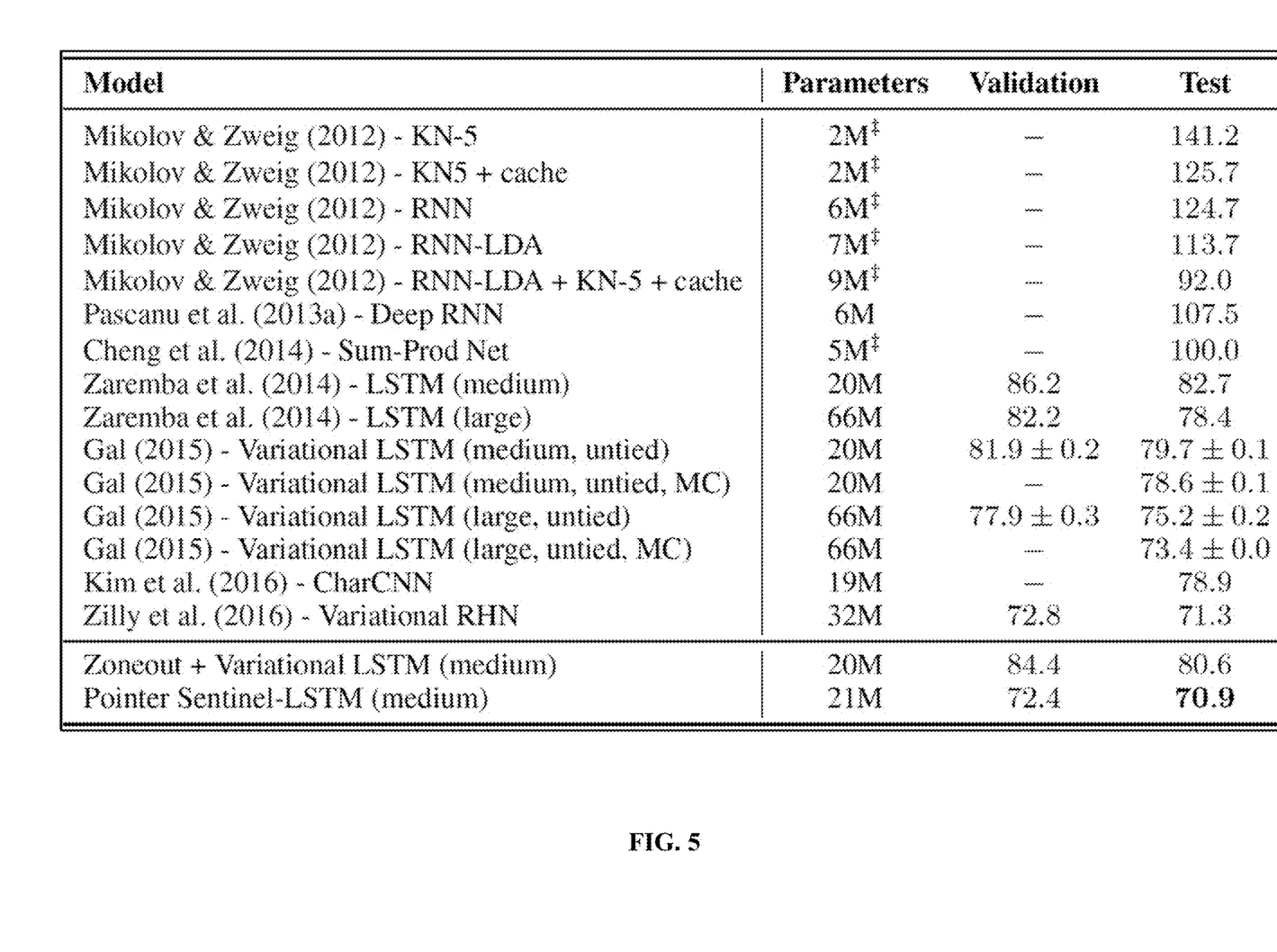
FIG. 5 illustrates a table that compares a pointer sentinel-LSTM to a variety of other models on a Penn Treebank dataset.

FIG. 5 illustrates a table that compares a pointer sentinel-LSTM to a variety of other models on a Penn Treebank dataset. A pointer sentinel-LSTM architecture achieves state of the art language modeling performance of 70.9 perplexity on the Penn Treebank dataset, while using far fewer parameters than a standard softmax LSTM.

Figure 6:
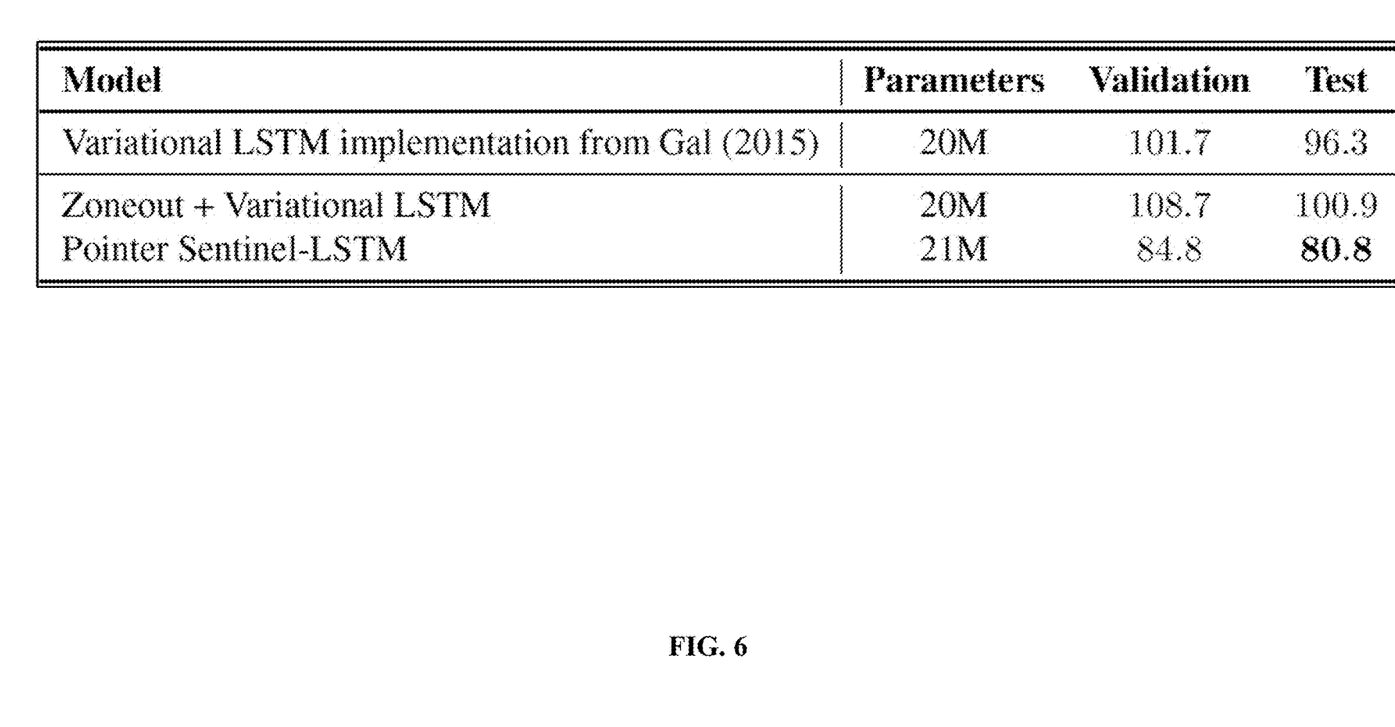
FIG. 6 is a table that compares a pointer sentinel-LSTM to a variety of other models on a WikiText-2 language modeling task.

FIG. 6 is a table that compares a pointer sentinel-LSTM to a variety of other models on a WikiText-2 language modeling task. A pointer sentinel-LSTM architecture achieves state of the art language modeling performance of 80.8 perplexity on the WikiText-2 language modeling task, while using far fewer parameters than a standard softmax LSTM.

A hypothesis as to why the pointer sentinel-LSTM can outperform an LSTM is that the pointer network 102 allows the pointer sentinel mixture architecture 100 to effectively reproduce rare words. The RNN 114 can better use hidden state capacity by relying on the pointer network 102. The pointer network 102 also allows for a sharper selection of a single token than may be possible using only the softmax classifier.

Figure 7:
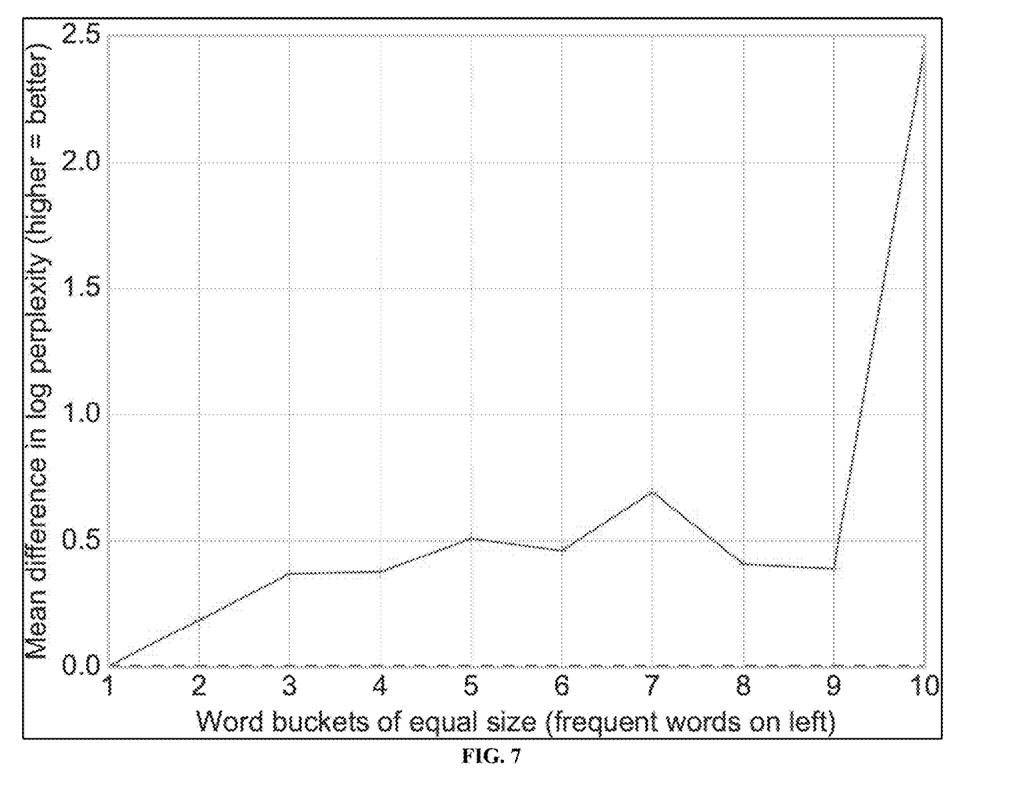
FIG. 7 is a graph that depicts mean difference in log perplexity on a Penn Treebank dataset when using a pointer sentinel-LSTM compared to a LSTM model.

FIG. 7 contains a graph which shows the improvement of perplexity when comparing the LSTM to the pointer sentinel-LSTM. Words are split across buckets according to frequency. As the words become rarer, the pointer sentinel-LSTM has stronger improvements in perplexity. Even on the Penn Treebank dataset, where there is a relative absence of rare words due to only selecting the most frequent 10k words, the pointer sentinel-LSTM provides a direct benefit. While the improvements are largest on rare words, the pointer sentinel-LSTM is still helpful on relatively frequent words. This is due to the pointer network 102 directly selecting the word or through the pointer supervision signal improving the RNN 114 by allowing gradients to flow directly to other occurrences of the word in that window.

Figure 8A:
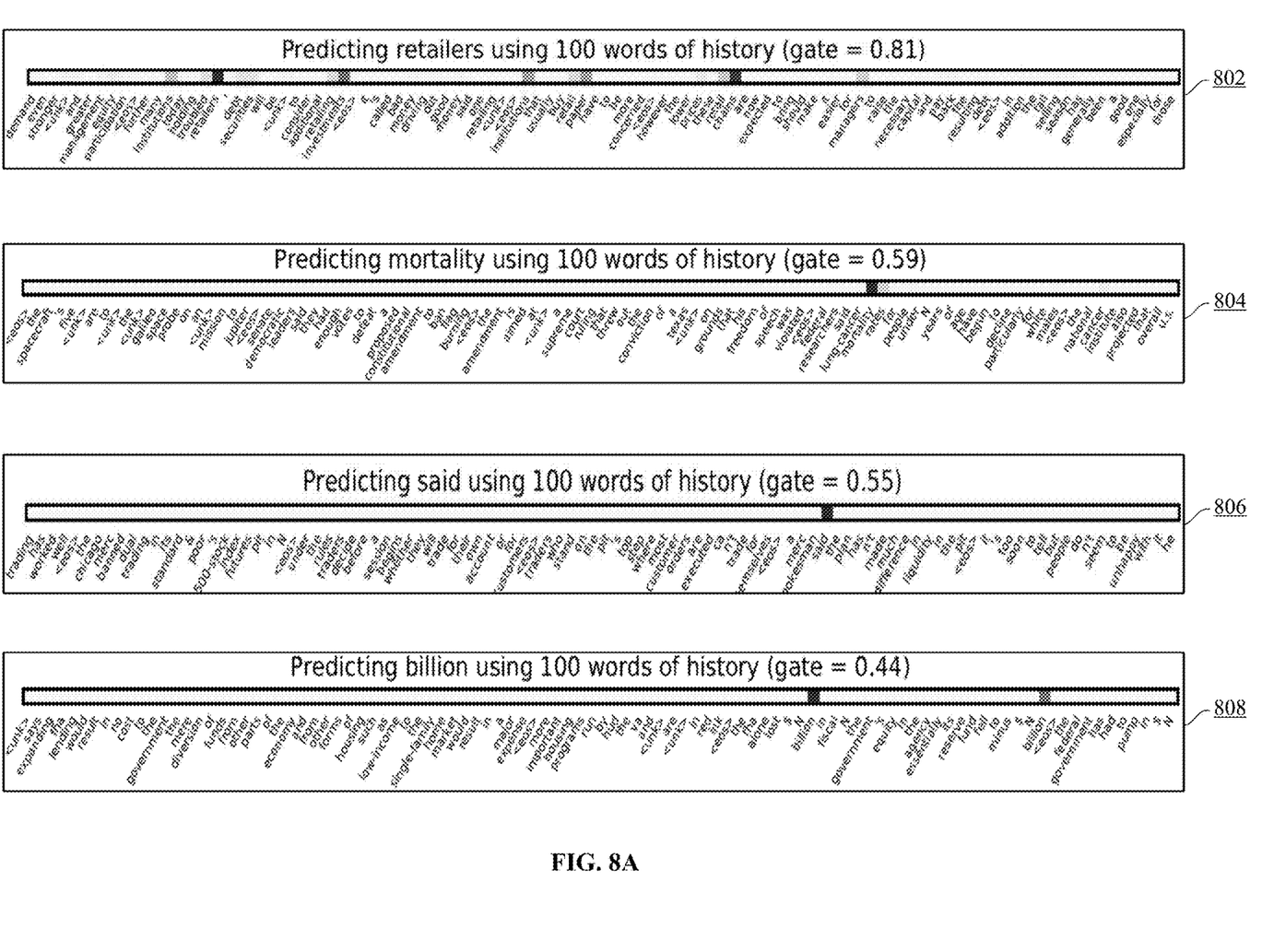
FIG. 8A and FIG. 8B illustrate visualized qualitative analysis of how a pointer network is used by the pointer sentinel mixture architecture of FIG. 1 to predict rare and out of vocabulary (OoV) tokens.
Figure 8B:
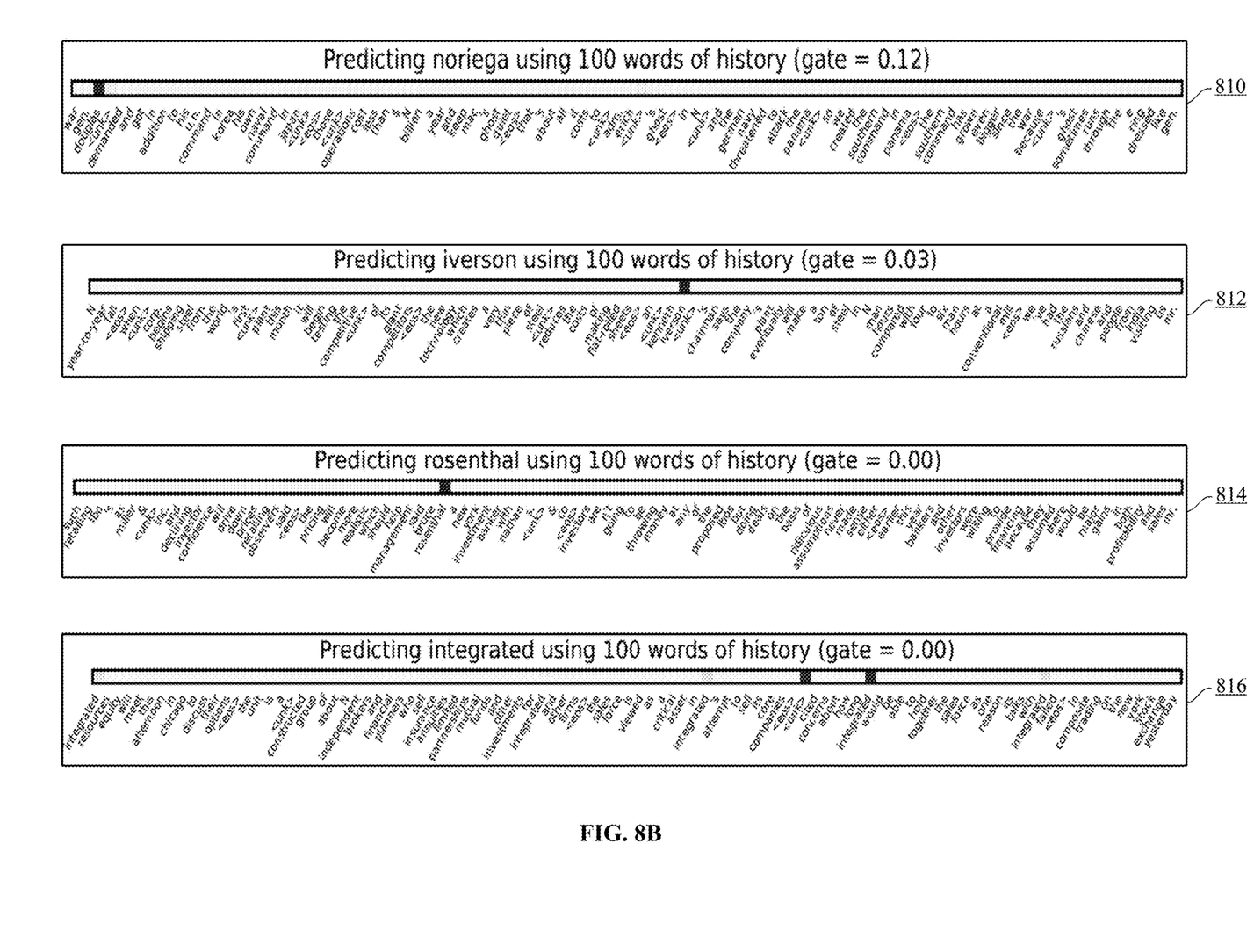

In a qualitative analysis, FIGS. 8A and 8B visualize the gate use and pointer attention for a variety of examples in the validation set, focusing on predictions where the gate is primarily used by the pointer network 102. As expected, the pointer network 102 is heavily used for rare names such as "Seidman" (23 times in training), "Iverson" (7 times in training), and "Rosenthal" (3 times in training). The pointer network 102 is also heavily used when it comes to other named entity names such as companies like "Honeywell" (8 times in training) and "Integrated" (41 times in training, though due to lowercasing of words this includes integrated circuits, fully integrated, and other generic usage). The pointer network 102 is also used for many frequent tokens. For selecting units of measurement (tons, kilograms, . . . ) or the short scale of numbers (thousands, millions, billions, . . . ), the pointer network 102 refers to recent usage. This is to be expected, especially when phrases are of the form increased from N tons to N tons. In some implementations, the pointer sentinel mixture architecture 100 relies on a mixture of the softmax and the pointer network 102 for predicting frequent verbs such as "said".

Additionally, the pointer network 102 points to words at the very end of the 100 word window (position 97), which is far longer horizon than the 35 steps that most language models truncate their backpropagation training to. This illustrates why the pointer sentinel mixture architecture 100 integrates the gating function into the pointer network 102. If the gating function only uses the RNN hidden states 116, it would need to be wary of words that were near the tail of the pointer window, especially if it is not able to accurately track exactly how long it has been since seeing a word. By integrating the gating function into the pointer network 102, the pointer sentinel mixture architecture 100 avoids the RNN hidden states 116 from having to maintain this intensive bookkeeping.

FIGS. 8A and 8B, for a qualitative analysis, visualize how the pointer network 102 is used within the pointer sentinel mixture architecture 100. The gate refers to the result of the gating function, with 1 indicating the vocabulary network 124 is exclusively used whilst 0 indicates the pointer network 102 is exclusively used. FIGS. 8A and 8B begin with predictions that are using the vocabulary network 124 primarily and move to ones that use the pointer network 102 primarily.

Referring to prediction 802, in predicting "the fall season has been a good one especially for those retailers", the pointer network 102 suggests many words from the historical window that would fit—"retailers", "investments", "chains", and "institutions". The gate is still primarily weighted towards the vocabulary network 124.

Referring to prediction 804, in predicting "the national cancer institute also projected that overall u.s. mortality", the pointer network 102 is focused on mortality and rates, both of which would fit. The gate is still primarily weighted towards the vocabulary network 124.

Referring to prediction 806, in predicting "people don't seem to be unhappy with it he said", the pointer network 102 correctly selects "said" and is almost equally weighted with the vocabulary network 124.

Referring to prediction 808, in predicting "the federal government has had to pump in $N billion", the pointer network 102 focuses on the recent usage of billion with highly similar context. The pointer network 102 is also relied upon more heavily than the vocabulary network 124.

Referring to prediction 810, in predicting "[unk]'s ghost sometimes runs through the e ring dressed like gen. noriega", the pointer network 102 reaches 97 timesteps back to retrieve "gen. douglas". Unfortunately this prediction is incorrect, but without additional context, a human would have guessed the same word. This additionally illustrates why the gating function is integrated into the pointer network 102. The named entity "gen. douglas" would have fallen out of the window in only four more timesteps because the RNN hidden states 116 would not be able to accurately retain information for almost 100 timesteps.

Referring to prediction 812, in predicting "mr. iverson", the pointer network 102 learns the ability to point to the last name of the most recent named entity. The named entity also occurs 45 timesteps ago, which is longer than the 35 steps that most language models truncate their backpropagation to.

Referring to prediction 814, in predicting "mr. rosenthal", the pointer network 102 is almost exclusively used and reaches back 65 timesteps to identify "bruce rosenthal" as the person speaking, correctly only selecting the last name.

Referring to prediction 816, in predicting "in composite trading on the new york stock exchange yesterday integrated", the company "Integrated" and the [unk] token are primarily attended to by the pointer network 102, with nearly the full prediction determined by the pointer network 102.

Computer System

Figure 9:
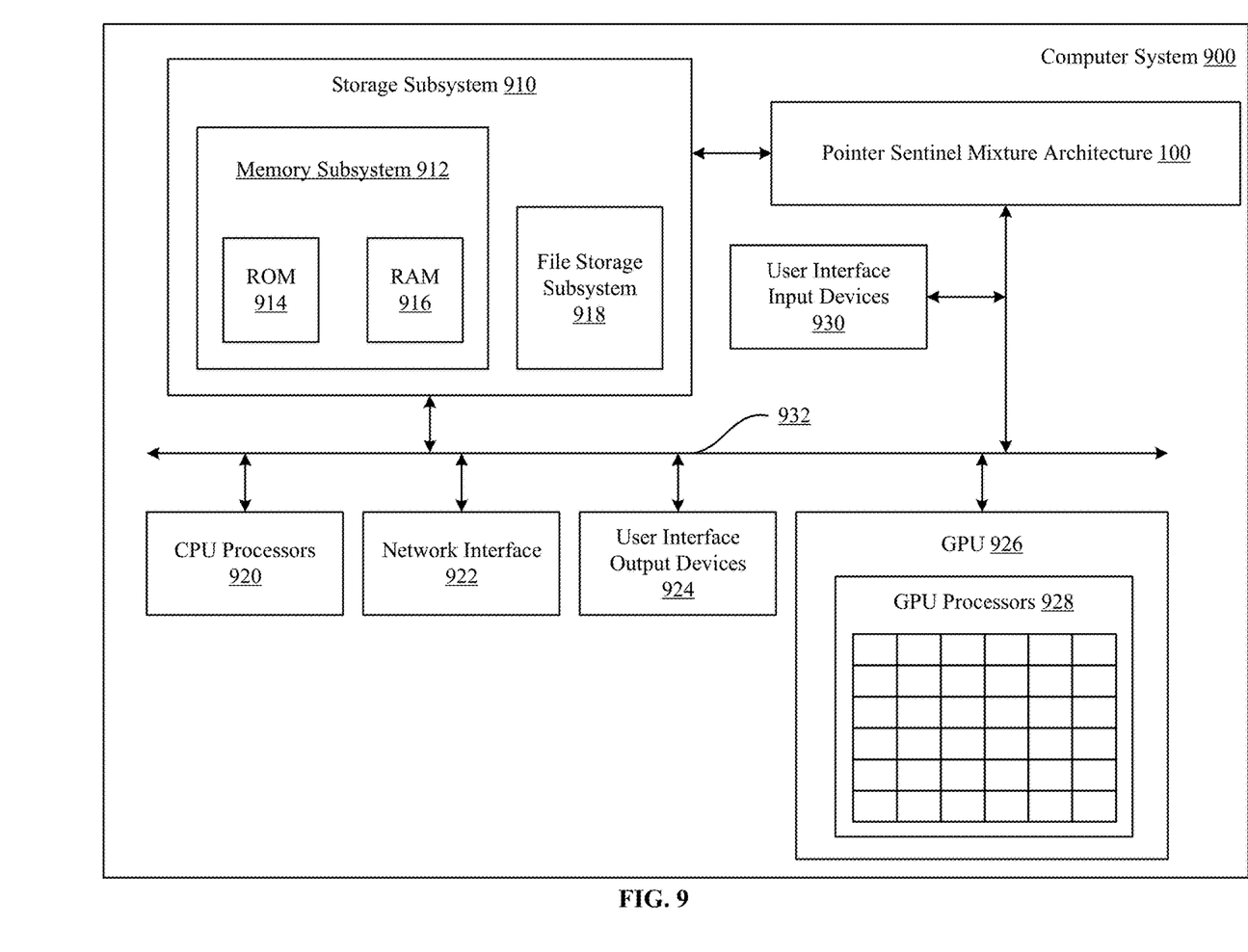
FIG. 9 is a simplified block diagram of a computer system that can be used to implement the pointer sentinel mixture architecture of FIG. 1.

FIG. 9 is a simplified block diagram of a computer system 900 that can be used to implement the pointer sentinel mixture architecture 100. Computer system 900 typically includes one or more CPU processors 920 that communicate with a number of peripheral devices via bus subsystem 932. These peripheral devices can include a memory subsystem 912 including, for example, memory devices and a file storage subsystem 918, user interface input devices 930, user interface output devices 924, a network interface subsystem 922, and a GPU 926 with multiple GPU processing cores or GPU processors 928. The input and output devices allow user interaction with computer system 900. Network interface subsystem 922 provides an interface to outside networks, including an interface to corresponding interface devices in other computer systems.

The operations of the pointer sentinel mixture architecture 100 are performed by the GPU processing cores 928, according to some implementations.

User interface input devices 930 or clients or client devices can include a keyboard; pointing devices such as a mouse, trackball, touchpad, or graphics tablet; a scanner; a touch screen incorporated into the display; audio input devices such as voice recognition systems and microphones; and other types of input devices. In general, use of the term "input device" is intended to include all possible types of devices and ways to input information into computer system 900.

User interface output devices 924 can include a display subsystem, a printer, a fax machine, or non-visual displays such as audio output devices. The display subsystem can include a cathode ray tube (CRT), a flat-panel device such as a liquid crystal display (LCD), a projection device, or some other mechanism for creating a visible image. The display subsystem can also provide a non-visual display such as audio output devices. In general, use of the term "output device" is intended to include all possible types of devices and ways to output information from computer system 900 to the user or to another machine or computer system.

Storage subsystem 910 stores programming and data constructs that provide the functionality of some or all of the modules and methods described herein. These software modules are generally executed by CPU processors 920 alone or in combination with other processors like GPU processors 928.

Memory subsystem 912 in the storage subsystem can include a number of memories including a main random access memory (RAM) 916 for storage of instructions and data during program execution and a read only memory (ROM) 914 in which fixed instructions are stored. A file storage subsystem 918 can provide persistent storage for program and data files, and can include a hard disk drive, a floppy disk drive along with associated removable media, a CD-ROM drive, an optical drive, or removable media cartridges. The modules implementing the functionality of certain implementations can be stored by file storage subsystem 918 or the memory subsystem 912, or in other machines accessible by the processor.

Bus subsystem 932 provides a mechanism for letting the various components and subsystems of computer system 900 communicate with each other as intended. Although bus subsystem 932 is shown schematically as a single bus, alternative implementations of the bus subsystem can use multiple busses. In some implementations, an application server (not shown) can be a framework that allows the applications of computer system 900 to run, such as the hardware and/or software, e.g., the operating system.

Computer system 900 itself can be of varying types including a personal computer, a portable computer, a workstation, a computer terminal, a network computer, a television, a mainframe, a server farm, a widely-distributed set of loosely networked computers, or any other data processing system or user device. Due to the ever-changing nature of computers and networks, the description of computer system 900 depicted in FIG. 9 is intended only as a specific example for purposes of illustrating the preferred embodiments of the present invention. Many other configurations of computer system 900 are possible having more or less components than the computer system depicted in FIG. 9.

The preceding description is presented to enable the making and use of the technology disclosed. Various modifications to the disclosed implementations will be apparent, and the general principles defined herein may be applied to other implementations and applications without departing from the spirit and scope of the technology disclosed. Thus, the technology disclosed is not intended to be limited to the implementations shown, but is to be accorded the widest scope consistent with the principles and features disclosed herein. The scope of the technology disclosed is defined by the appended claims.

What is claimed is:

1. A method of predicting a token given context text and vocabulary text, including circumstances in which the token is in the vocabulary text and not in the context text, the method including:
   mixing results of a pointer network and a vocabulary network to predict the token, with the mixing governed by a gate probability mass;
   calculating the results of the pointer network over a window of tokens in the context text and the gate probability mass by
   using
      a trained sentinel gate vector,
      output state vectors of a recurrent neural network (RNN) for each position in the window of tokens,
      a query vector formulated from a final output state vector of the RNN,
      an unnormalized gate value calculated as a distance measure product between the query vector and the trained sentinel gate vector, and
      unnormalized attention values for each of the positions in the window of tokens, each calculated as a distance measure product between the query vector and each of the output state vectors,
      concatenating the unnormalized attention values and the unnormalized gate value, and
      exponentially normalizing the concatenated attention and gate values to produce a vector of attention probability masses and the gate probability mass;
   calculating the results of the vocabulary network by computing, from the final output state vector of the RNN, a distribution of vocabulary probability masses over tokens in the vocabulary text;
   producing a distribution of output probability masses over the tokens in the context text and the vocabulary text, including:
      if a token is in the context text and not in the vocabulary text, then producing an output probability mass for the token as a corresponding attention probability mass,
      if a token is in the vocabulary text is and not in the context text, then producing an output probability mass for the token by multiplying the gate probability mass with a corresponding vocabulary probability mass, and
      if a token is in both the context text and the vocabulary text, then producing an output probability mass for the token by multiplying the gate probability mass with a corresponding vocabulary probability mass and adding a corresponding attention probability mass; and
   selecting a token with a maximum output probability mass as a response to the query vector.

2. The method of claim 1, wherein the gate probability mass results from exponentially normalizing the unnormalized gate value.

3. The method of claim 1, wherein a sum of the vector of the attention probability masses and the gate probability mass being a predetermined constant.

4. The method of claim 1, wherein a sum of the distribution of the vocabulary probability masses over the tokens in the vocabulary text being a predetermined constant.

5. The method of claim 1, wherein a sum of the distribution of the output probability masses over the tokens in the context text and the vocabulary text being a predetermined constant.

6. The method of claim 1, wherein a token appears at multiple positions in the context text, further including:
   adding attention probability masses corresponding to each of the positions of the token in the context text to calculate a final attention probability mass for the token; and
   using the final attention probability mass to calculate an output probability mass for the token.

7. The method of claim 1, wherein the trained sentinel gate vector controls accumulation of information from the vocabulary network and the pointer network.

8. The method of claim 7, wherein the gate probability mass being unity results in accumulation of information from the vocabulary network.

9. The method of claim 7, wherein the gate probability mass being zero results in accumulation of information from the pointer network.

10. The method of claim 1, wherein the query vector is formulated from the final output state vector of the RNN by processing the final output state vector through a linear layer to generate a non-linear projection.

11. The method of claim 1, wherein the trained sentinel gate vector is trained a priori.

12. The method of claim 11, wherein a dynamic sentinel gate vector is formulated from the final output state vector of the RNN by concatenating the final output state vector with the trained sentinel gate vector and processing the concatenation through a linear layer to generate a non-linear projection.

13. The method of claim 1, wherein the token is a word.

14. The method of claim 1, wherein the token is a character.

15. The method of claim 1, wherein the token is a phrase.

16. A method of predicting a token given context text and vocabulary text, the method including:
   mixing results of a pointer network and a vocabulary network to predict the token, with the mixing governed by a gate probability mass;
   calculating the results of the pointer network over a window of tokens in the context text and the gate probability mass by
      using
         a trained sentinel gate vector,
         output state vectors of a recurrent neural network (RNN) for each position in the window of tokens,
         a query vector formulated from a final output state vector of the RNN,
         an unnormalized gate value calculated as a distance measure product between the query vector and the trained sentinel gate vector, and
         unnormalized attention values for each of the positions in the window of tokens, each calculated as a distance measure product between the query vector and each of the output state vectors,
      concatenating the unnormalized attention values and the unnormalized gate value, and
      exponentially normalizing the concatenated attention and gate values to produce a vector of attention probability masses and the gate probability mass;
   calculating the results of the vocabulary network by computing, from the final output state vector of the RNN, a distribution of vocabulary probability masses over tokens in the vocabulary text;
   producing a distribution of output probability masses over the tokens in the context text and the vocabulary text; and
   selecting a token with a maximum output probability mass as a response to the query vector.

17. The method of claim 16, further including repeatedly applying the method to context texts that present instances in which:
   if a selected token that completes the context text is in the context text and not in the vocabulary text, then producing an output probability mass for the token as a corresponding attention probability mass,
   if a token is in the vocabulary text is and not in the context text, then producing an output probability mass for the token by multiplying the gate probability mass with a corresponding vocabulary probability mass, and
   if a token is in both the context text and the vocabulary text, then producing an output probability mass for the token by multiplying the gate probability mass with a corresponding vocabulary probability mass and adding a corresponding attention probability mass.

18. A method of predicting a token given context text and vocabulary text, the method including:
   mixing results of a pointer network and a vocabulary network to predict the token, with the mixing governed by a gate probability mass;
   calculating the results of the pointer network over a window of tokens in the context text and the gate probability mass by
      using
         a trained sentinel gate vector,
         output state vectors of a recurrent neural network (RNN) for each position in the window of tokens,
         a query vector formulated from a final output state vector of the RNN,
         an unnormalized gate value calculated as a distance measure product between the query vector and the trained sentinel gate vector, and
         unnormalized attention values for each of the positions in the window of tokens, each calculated as a distance measure product between the query vector and each of the output state vectors,
      concatenating the unnormalized attention values and the unnormalized gate value, and
      exponentially normalizing the concatenated attention and gate values to produce a vector of attention probability masses and the gate probability mass;
   calculating the results of the vocabulary network by computing, from the final output state vector of the RNN, a distribution of vocabulary probability masses over tokens in the vocabulary text;
   combining results after applying the gate probability mass to at least one of results of the pointer network and the vocabulary network; and
   selecting the token responsive to the query vector from tokens in the context text or in the vocabulary text, based on the combined results.

19. A non-transitory computer readable storage medium impressed with computer program instructions, the instructions, when executed on a processor, implement the system of claim 1.

20. A non-transitory computer readable storage medium impressed with computer program instructions, the instructions, when executed on a processor, implement the system of claim 16.

21. A non-transitory computer readable storage medium impressed with computer program instructions, the instructions, when executed on a processor, implement the system of claim 18.

22. A system including one or more processors coupled to memory, the memory loaded with computer instructions, the instructions, when executed on the processors, implement actions of claim 1.

23. A system including one or more processors coupled to memory, the memory loaded with computer instructions, the instructions, when executed on the processors, implement actions of claim 16.

24. A system including one or more processors coupled to memory, the memory loaded with computer instructions, the instructions, when executed on the processors, implement actions of claim 18.

* * * * *